A. J. HEINSIUS.
LOCKING MECHANISM FOR CHAINS.
APPLICATION FILED JAN. 9, 1917.

1,241,477.

Patented Sept. 25, 1917.

A. J. HEINSIUS.
LOCKING MECHANISM FOR CHAINS.
APPLICATION FILED JAN. 9, 1917.

1,241,477.

Patented Sept. 25, 1917.

UNITED STATES PATENT OFFICE.

ALBERT J. HEINSIUS, OF PITTSBURGH, PENNSYLVANIA.

LOCKING MECHANISM FOR CHAINS.

1,241,477.   Specification of Letters Patent.   Patented Sept. 25, 1917.

Application filed January 9, 1917.   Serial No. 141,440.

*To all whom it may concern:*

Be it known that I, ALBERT J. HEINSIUS, a citizen of the United States, and residing in the city of Pittsburgh, in the county of Allegheny and State of Pennsylvania, have invented or discovered new and useful Improvements in Locking Mechanism for Chains, of which the following is a specification.

My invention comprises certain new and useful improvements in locking rings used in connection with anti-skid chains, and other chains.

More particularly, my present invention is an improvement on the form of locking ring shown in my Letters Patent of the United States No. 1,199,698, issued September 26th, 1916.

In said Letters Patent I show a locking ring having a main bore of sufficient size to permit the free passage therethrough of the chain, and a contracted or slotted portion communicating with said main bore, into which a link of the chain may be inserted edgewise only.

In practice, I have found that occasionally the engaged link may become accidentally loosened from the slot, thus unlocking the chain, and I have devised my improved form of locking ring to overcome this objection.

To prevent this accidental unlocking of the chain from the locking ring, I provide means whereby the link to be inserted into or withdrawn from the slot must be intentionally and manually turned into an angle relation to the plane of the ring which it cannot accidentally assume and, while held in said angle, moved longitudinally relative to the ring.

Figure 1:
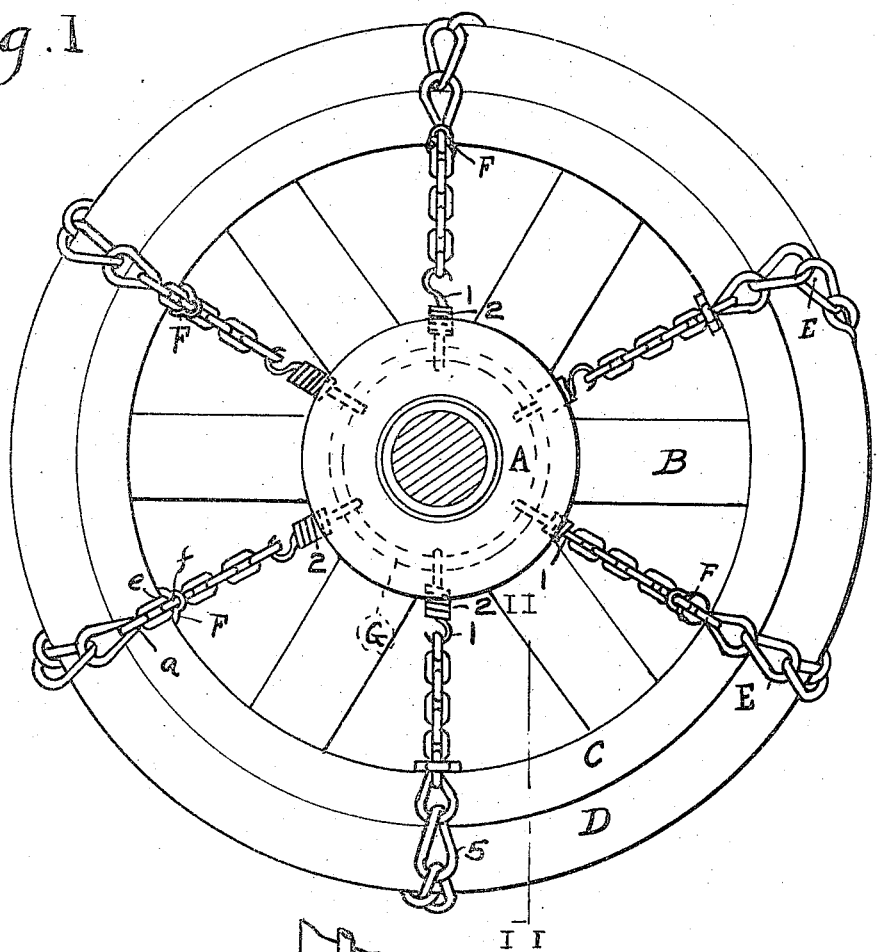
Figure 2:
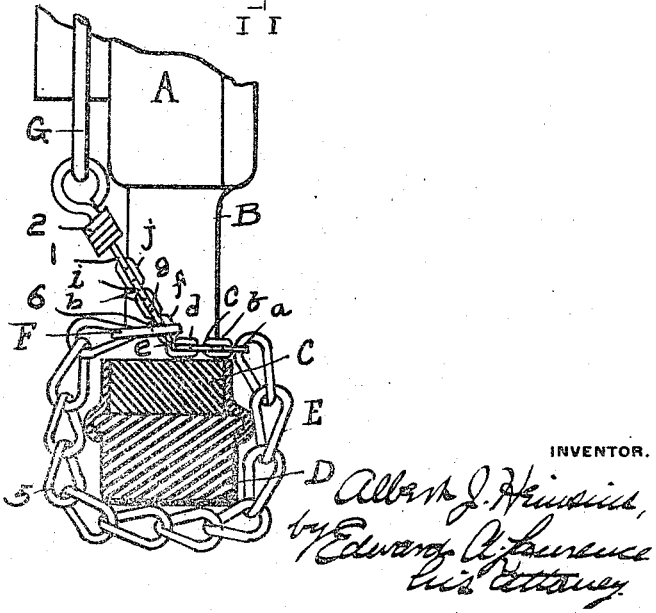
Figure 3:
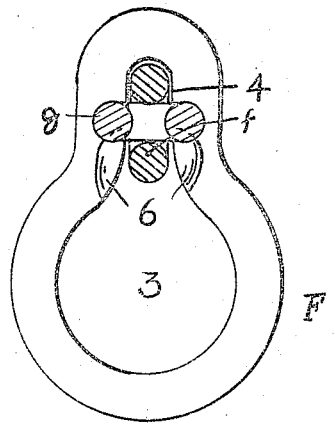
Figure 4:
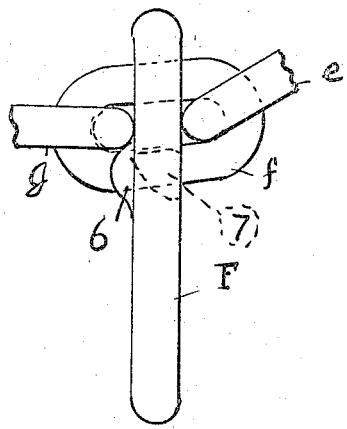
Figure 5:
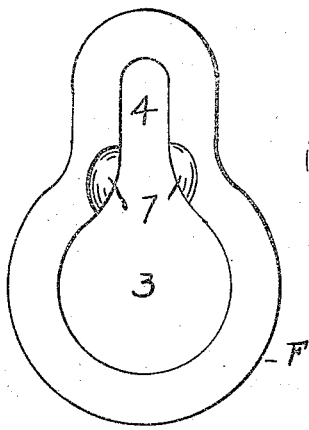
Figure 6:
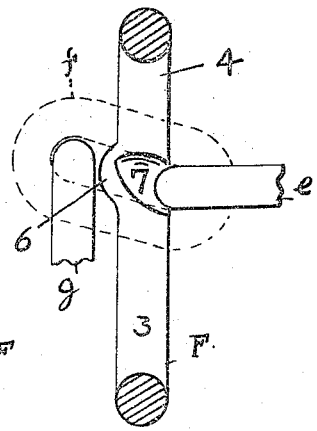

In the accompanying drawings, Figure 1 is a side view of a vehicle wheel provided with my patented anti-skid chains fitted with my improved locking rings; Fig. 2 is a sectional view of the same along the line II—II in Fig. 1; Fig. 3 is an outer face view of the locking ring, the links of the chain locked therein being shown in cross section; Fig. 4 is a side elevation of the same; Fig. 5 is a view similar to Fig. 3 but showing the opposite face of the ring, the chain being omitted, and Fig. 6 is a longitudinal section of the ring showing the chain unlocked and ready for disengagement.

The following is a detailed description of the embodiment of my invention shown in the drawings.

A represents the hub; B the spokes; C the rim, and D the tire of a vehicle wheel. E represents a plurality of chain loops or annuli encircling the rim and tire by having one end of the chain drawn through and locked in a locking member or ring F on the other end of the chain. The loose ends of the chain are preferably engaged by hooks 1 on helical spring members 2 whose inner ends are connected to the metal annulus G which is positioned concentric with the hub A by its connection with the various spring members 2.

The locking rings F are comprised of an enlarged, preferably circular portion, 3, through which the other end of the chain may be passed freely, and, communicating therewith, a contracted or slotted portion 4.

The main portion of the chains E are preferably formed of the usual twisted log chain links 5, but I prefer to form the end of the chain of smaller flat or untwisted links, such as *a, b, c, d, e, f, g, h, i,* and *j,* which may be slid edgewise into the slot 4.

It is evident that when one of the flat links is inserted into said slot, the links on either side of said engaged link, being necessarily at an angle to the engaged link and the slot in which it is seated, will abut against the wall of said slot and prevent the chain from being drawn through the slot in either direction. To prevent the engaged link, such as *f* in Fig. 4 being moved out of the slot into the larger bore of the ring F, thus unlocking the chain from the ring, I provide a pair of locking projections 6 on the outer face of the ring adjacent to the mouth of the slot 4 in the path of the next link *g* toward the free end of the chain. This is clearly shown in Fig. 4 and it is evident until the link *f* is moved longitudinally to enable the link *g* to override the projections 6, the chain end cannot be unlocked from the ring. This longitudinal movement of the link *f* is however prevented by the contact of the end of the next link *e* with the ring F.

7 represents a pair of seats or depressions formed in the walls of the slot 4 opposing the projections 6, and conveniently formed by striking up the material of the ring to form the projections 6.

As shown in Fig. 6, the chain may be unlocked from the slot 4 by inserting the end of the link *e* into the seats 7 and thus permitting the longitudinal movement of the link sufficient to permit the link *g* to override the projections 6.

To prevent the accidental insertion of the end of the link *e* into said seats 7 and the consequent unlocking of the chain from the ring, the seats are preferably set inwardly from the projections 6 toward the axis of the ring F, thus necessitating the manual or intentional turning of the engaged link *f* into a plane, as shown in dotted lines in Fig. 6, which it cannot accidentally assume when the chain is locked in a loop about the rim and tire of the wheel.

It is thus evident that the chain end may be easily and quickly locked into or unlocked from the ring F, but accidental unlocking is impossible.

To insert and lock the chain end, for instance the individual link *f*, in the slot 4, the chain is inserted through the main bore of the ring F and drawn to the desired tautness. The end of the link adjacent to the link to be inserted into the slot, shown as links *e* and *f* in Fig. 6 respectively, is inserted into the recesses 7, thus permitting the link *f* to be moved longitudinally sufficiently to permit the link *g* to override the projections 6, so that the link *f* may move into the slot. After the link *g* has passed the projections, the link *f* may be moved longitudinally in the opposite direction, so that the link *e* may be drawn out of the recesses 7 and assume its normal position, as shown in Fig. 4.

The engagement of the chain end by the hook 1 is not necessary to prevent the accidental unlocking of the chain end, but prevents the loose end from rattling or threshing, and also prevents the chain loop from turning on the rim so that the locking ring or untwisted links would come into contact with the road surface.

What I desire to claim is:—

1. A locking member for chain, comprising a ring through whose main bore the chain may pass freely, and provided with a slot communicating with said main bore and into which slot a chain link may be moved from the main bore when said link is inserted edgewise into said slot, and projections from the face of ring at either side of the open end of said slot adapted to be encountered by the next chain link turned crosswise of said slotted opening and thus prevent the first mentioned link moving out of said slotted opening into said main bore.

2. A locking member for chain comprising a ring, provided with a main bore, through which the chain may pass freely, and said bore being extended at one side to form a radial slot of sufficient width to accommodate a link of the chain when turned edgewise, a pair of projections, one on either wall of the slot adjacent to its mouth, extending from the face of the ring and adapted to contact with the next adjacent link to prevent the escape of the first mentioned link from said slot, and a pair of recesses in the walls of said slot on the opposite face of the ring from said projections, so that by inserting the end of the next adjacent link on the opposite side of the first mentioned link from the second mentioned link into said recesses, the first mentioned link may be moved longitudinally to enable the second mentioned link to over-ride said projections, substantially as and for the purposes described.

3. A locking member for chain comprising a ring, provided with a main bore, through which the chain may pass freely, and said bore being extended at one side to form a radial slot of sufficient width to accommodate a link of the chain when turned edgewise, a pair of projections, one on either wall of the slot adjacent to its mouth, extending from the face of the ring and adapted to contact with the next adjacent link to prevent the escape of the first mentioned link from said slot, and a pair of recesses in the walls of said slot on the opposite face of the ring from said projections, so that by inserting the end of the next adjacent link on the oposite side of the first mentioned link from the second mentioned link into said recesses, the first mentioned link may be moved longitudinally to enable the second mentioned link to override said projections, said recesses being nearer to the central axis of said ring than said projections, thus requiring said third mentioned link to be moved toward said axis to enter said recesses, substantially as and for the purposes described.

Signed at Pittsburgh, Penna., this 5th day of January, 1917.

ALBERT J. HEINSIUS.

Copies of this patent may be obtained for five cents each, by addressing the "Commissioner of Patents, Washington, D. C."